(12) United States Patent
Yoshimura

(10) Patent No.: US 11,020,912 B2
(45) Date of Patent: Jun. 1, 2021

(54) JOINT STRUCTURE

(71) Applicant: SUBARU CORPORATION, Tokyo (JP)

(72) Inventor: Kensuke Yoshimura, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 16/683,008

(22) Filed: Nov. 13, 2019

(65) Prior Publication Data

US 2020/0189208 A1 Jun. 18, 2020

(30) Foreign Application Priority Data

Dec. 14, 2018 (JP) .............................. JP2018-234284

(51) Int. Cl.
*B32B 5/14* (2006.01)
*B29C 65/00* (2006.01)
*B32B 3/00* (2006.01)

(52) U.S. Cl.
CPC ...... *B29C 66/12423* (2013.01); *B29C 66/721* (2013.01); *B32B 3/00* (2013.01); *B32B 5/145* (2013.01); *Y10T 428/195* (2015.01)

(58) Field of Classification Search
CPC ....... Y10T 428/195; B32B 5/02; B32B 5/145; B29C 66/721; B29C 66/12423
See application file for complete search history.

(56) References Cited

U.S. PATENT DOCUMENTS

2009/0114772 A1 5/2009 Maenz
2017/0066216 A1 3/2017 Kosugi et al.

FOREIGN PATENT DOCUMENTS

| DE | 10 2015 222 297 A1 | 5/2017 | |
| DE | 10 2017 206 687 A1 | 10/2018 | |
| EP | 0085410 A2 * | 8/1983 | ......... B29C 65/4875 |
| JP | 2009-504493 A | 2/2009 | |
| JP | 2017-052183 A | 3/2017 | |

OTHER PUBLICATIONS

Machine translation of EP0085410, (Year: 2020).*
Extended European Search Report dated Apr. 23, 2020 for European Patent Application No. 19214852.6-1014.

* cited by examiner

*Primary Examiner* — Alexander S Thomas
(74) *Attorney, Agent, or Firm* — McGinn I.P. Law Group, PLLC.

(57) ABSTRACT

A joint structure includes a first member and a second member. The first member includes a projection having a distal end and a base end. The distal end is thicker than the base end. The second member is made of a material different from a material of the first member and has a fitting groove into which the projection is to be inserted. The projection includes, on its surface, an inclined surface extending from the distal end to the base end and inclined with respect to a facing direction in which the first member and the second member face each other. The projection at least includes a plurality of fiber-containing layers that each have a sections in which a fiber extends along the inclined surface.

20 Claims, 2 Drawing Sheets

JOINT STRUCTURE

CROSS-REFERENCE TO RELATED APPLICATIONS

The present application claims priority from Japanese Patent Application No. 2018-234284 filed on Dec. 14, 2018, the entire contents of which are hereby incorporated by reference.

BACKGROUND

The disclosure relates to joint structures.

For example, according to Japanese Unexamined Patent Application Publication (JP-A) No. 2017-052183, in building an aircraft or the like, a first member made of a fiber reinforced plastic or the like and a second member made of a metallic material are coupled together. For example, the first member and the second member are bonded together with an adhesive or fastened together with fasteners, such as bolts or rivets.

When an aircraft is transported, the main wings and the fuselage are attached to and detached from each other. Hence, a solution that facilitates the attachment and detachment compared with the bonding or fastening with fasteners is desired. For example, JP-A No. 2009-504493 suggests to use a dovetail joint, which is a type of joints used in construction.

SUMMARY

An aspect of the disclosure provides a joint structure includes a first member and a second member. The first member includes a projection having a distal end and a base end. The distal end is thicker than the base end. The second member is made of a material different from a material of the first member and has a fitting groove into which the projection is to be inserted. The projection includes, on its surface, an inclined surface extending from the distal end to the base end and inclined with respect to a facing direction in which the first member and the second member face each other. The projection at least includes a plurality of fiber-containing layers that each have a section in which a fiber extends along the inclined surface.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

In the following, an embodiment of the technology is described in detail with reference to the accompanying drawings. Note that the following description is directed to an illustrative example of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiment which are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description. When a structure such as a dovetail joint disclosed in JP-A No. 2009-504493 is applied to a joint structure for joining members that are composed of different types of materials including a fiber reinforced plastic, as in the case of JP-A No. 2017-052183, loads are likely to be applied between layers, decreasing the strength, depending on the arrangement of layers composed of the fiber reinforced plastic.

It is desirable to provide a joint structure that can suppress a decrease in strength.

Figure 1:
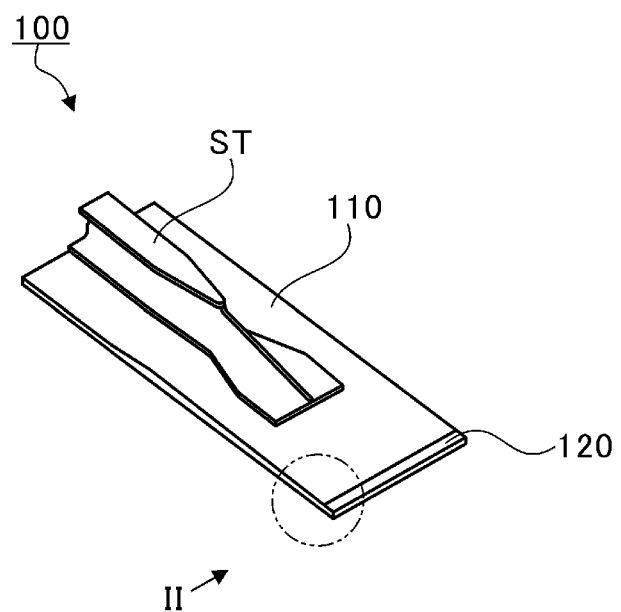
FIG. 1 is a perspective view of a joint structure provided on members constituting an aircraft.

FIG. 1 is a perspective view of a joint structure 100 provided on members constituting an aircraft. Herein, an example of a first member 110 is a skin that constitutes the main wings of an aircraft and to which a stringer ST is attached. An example of a second member 120 is a member that constitutes the fuselage of an aircraft and that is joined to the skin. FIG. 1 illustrates only a portion of the second member 120 adjacent to the first member 110. The first member 110 and the second member 120 are, for example, substantially plate-shaped. The first member 110 and the second member 120 may be other members constituting an aircraft or may be members constituting a system other than an aircraft.

The first member 110 is made of, for example, a fiber reinforced plastic (FRP). The second member 120 is made of, for example, a titanium alloy. The first member 110 and the second member 120 may be made of other materials, as long as they are made of different materials, and as long as the first member 110 is made of a composite material.

Figure 2:
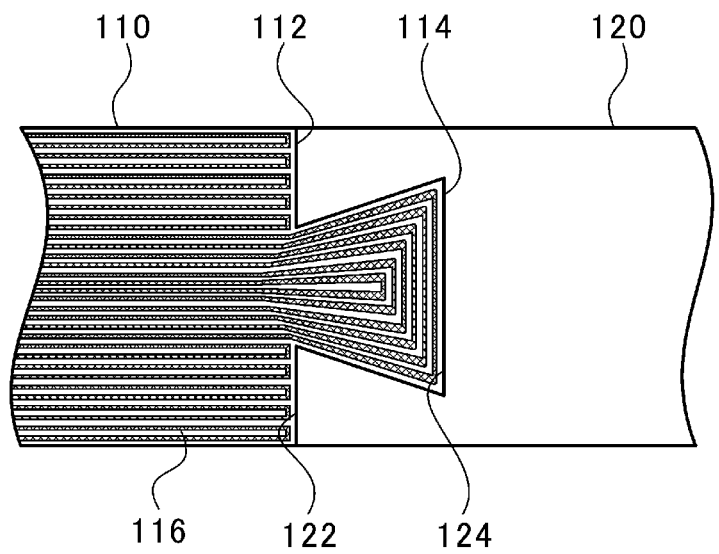
FIG. 2 illustrates a portion encircled by a two-dot chain line in FIG. 1, as viewed in the direction of arrow II.

FIG. 2 illustrates a portion encircled by a two-dot chain line in FIG. 1, as viewed in the direction of arrow II. As illustrated in FIG. 2, the first member 110 has a projection 114 at an end 112 closer to the second member 120. The second member 120 has a fitting groove 124 in an end 122 closer to the first member 110. When the projection 114 is inserted into the fitting groove 124, the first member 110 and the second member 120 are joined together.

Figure 3:
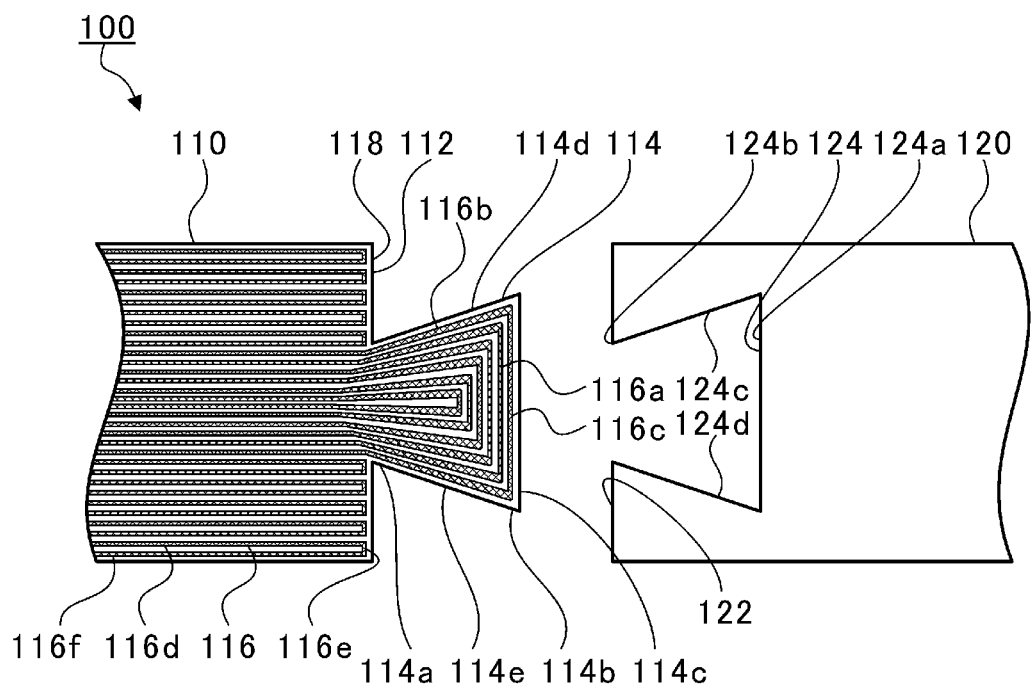
FIG. 3 illustrates a first member and a second member before being joined together.

FIG. 3 illustrates the first member 110 and the second member 120 before being joined together. As illustrated in FIG. 3, the projection 114 is configured such that a distal end 114*b*, which is farther from the end 112 of the first member 110, is thicker than a base end 114*a*, which is closer to the end 112. In other words, the distal end 114*b* is larger than the base end 114*a* in the vertical direction in FIG. 3. The distal end 114*b* has an end face 114*c*. The end face 114*c* extends perpendicular to the direction in which the end 112 of the first member 110 and the end 122 of the second member 120 face each other (hereinbelow, simply, a facing direction).

The projection 114 has inclined surfaces 114*d* and 114*e*. The inclined surfaces 114*d* and 114*e* extend from the distal end 114*b* to the base end 114*a*. The inclined surface 114*d* is located on one side (i.e., the upper side in FIG. 3), and the inclined surface 114*e* is located on the other side (i.e., the lower side in FIG. 3) of the first member 110 with respect to the center of the first member 110 in the thickness direction (i.e., the vertical direction in FIG. 3).

The fitting groove 124 is formed so as to receive the projection 114. For example, a bottom surface 124a of the fitting groove 124 is larger than an opening 124b in the end 122 of the fitting groove 124 in the vertical direction in FIG. 3. Inner wall surfaces 124c and 124d extend from the bottom surface 124a to the opening 124b. The inner wall surfaces 124c and 124d are inclined in the same way as the inclined surfaces 114d and 114e of the projection 114.

The distal end 114b of the projection 114 is larger than the opening 124b of the fitting groove 124. Hence, the projection 114 cannot be inserted into the fitting groove 124 simply by moving the projection 114 to the right in FIG. 3. For example, after the projection 114 is moved in front of the fitting groove 124 in FIG. 3, the projection 114 and the fitting groove 124 are positioned so as to overlap each other, as illustrated in FIG. 2. Then, the projection 114 is moved toward the far side in FIG. 2 so as to be inserted into the fitting groove 124.

Figure 4:
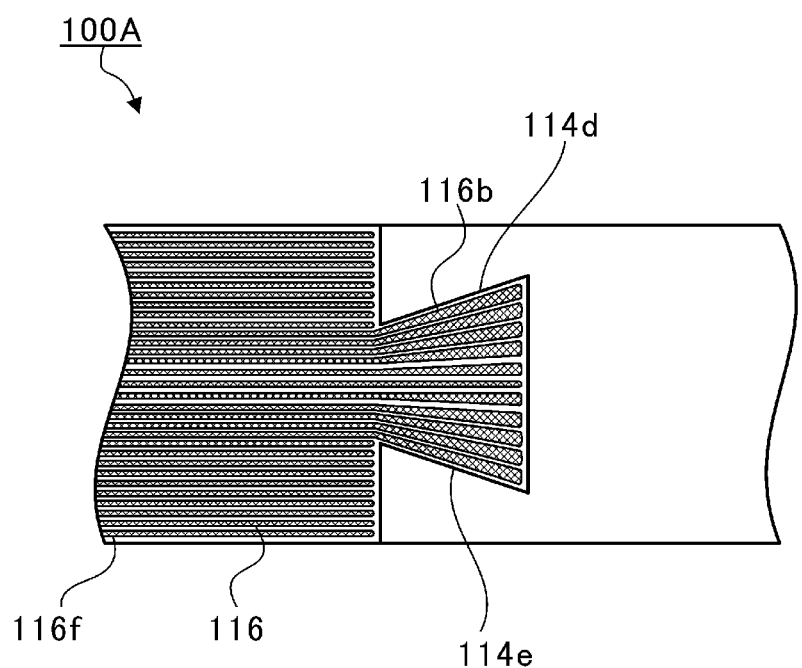
FIG. 4 illustrates a modification.

The first member 110 having the projection 114 is formed of a plurality of fiber-containing layers 116 composed of a composite material. Herein, the fiber-containing layers 116 are made of, for example, a fiber and a resin. In FIGS. 2, 3, and 4, the fiber-containing layers 116 are cross-hatched. Although the spaces between the layers are illustrated in a large size to facilitate understanding of the extending direction of the fiber-containing layers 116, there may be almost no spaces between the layers.

As illustrated in FIG. 3, in the fiber-containing layers 116, fiber-containing layers 116a constituting the projection 114 have sections 116b extending along the inclined surfaces 114d and 114e. The sections 116b closer to the inclined surfaces 114d and 114e (i.e., the surfaces) are more parallel to the inclined surfaces 114d and 114e. The fiber-containing layers 116a also have sections 116c extending along the end face 114c.

In each fiber-containing layer 116a, the sections 116b extending along the inclined surfaces 114d and 114e and the section 116c extending along the end face 114c are continuous. In other words, the sections 116b and 116c are formed of the same fiber-containing layer 116a.

In the first member 110, the face (end 112) having the projection 114 is referred to as a base end face 118. The base end 114a of the projection 114 is disposed on the base end face 118. In the fiber-containing layers 116, a plurality of fiber-containing layers 116d constituting the base end face 118 each have a section 116e extending along the base end face 118. The fiber-containing layers 116d also each have sections 116f extending in the facing direction. The section 116e extending along the base end face 118 and the sections 116f extending in the facing direction are continuous. In other words, the sections 116e and 116f are formed of the same fiber-containing layer 116d.

As described, the joint structure 100 has a dovetail-joint structure. The dovetail joint has high dimensional accuracy. In addition, it has been difficult to arrange such complex fiber-containing layers 116 as described above by using a conventional prepreg laminating method. In preparing the joint structure 100, a three-dimensional printer that forms an object by jetting a fiber and a resin from separate nozzles is used. This makes it possible to arrange the complex fiber-containing layers 116 with high dimensional accuracy.

For example, in the sections 116b of the fiber-containing layers 116, the layer thickness is larger toward the distal end 114b than the other sections. When the sections 116b are formed, the thickness of the sections 116b can be increased by increasing the ratio of the amount of fiber and resin jetted from the nozzles to the moving speed of the nozzles.

As described above, the fiber-containing layers 116 have the sections 116b extending along the inclined surfaces 114d and 114e. Hence, compared with a configuration in which the ends of the fiber-containing layers 116 are disposed at the inclined surfaces 114d and 114e, a decrease in strength can be suppressed.

FIG. 4 illustrates a modification. As illustrated in FIG. 4, a joint structure 100A according to the modification does not have the sections 116c and 116e of the fiber-containing layers 116, which are provided in the embodiment described above, but has the sections 116b and 116f of the fiber-containing layers 116. When the sections 116b are formed, as in the above-described embodiment, the thickness of the sections 116b is increased by increasing the ratio of the amount of fiber and resin jetted from the nozzles to the moving speed of the nozzles.

The fiber-containing layers 116 according to the modification also include the sections 116b extending along the inclined surfaces 114d and 114e, as in the above-described embodiment. Hence, compared with a configuration in which the ends of the fiber-containing layers 116 are arranged at the inclined surfaces 114d and 114e, a decrease in strength can be suppressed.

Although the preferred embodiment of the disclosure has been described with reference to the attached drawings, the disclosure is of course not limited to the embodiment. It is obvious to those skilled in the art that various changes and modifications can be made within the scope of the claims, and such changes and modifications are also within the technical scope of the disclosure.

For example, in the above-described embodiment, a configuration has been described in which the fiber-containing layers 116a constituting the projection 114 have the sections 116c extending along the end face 114c. In this case, a decrease in strength can be suppressed compared with a configuration in which the ends of the fiber-containing layers 116a are disposed at the end face 114c. However, it is also possible not to provide the sections 116c, as in the modification.

Furthermore, in the above-described embodiment, a configuration has been described in which, in the fiber-containing layers 116a, the sections 116b extending along the inclined surfaces 114d and 114e and the sections 116c extending along the end face 114c are continuous. This configuration can suppress a decrease in strength compared with a configuration in which the sections 116b and 116c are not continuous. However, the sections 116b and 116c may be separated.

In the above-described embodiment, a configuration has been described in which the plurality of fiber-containing layers 116d constituting the base end face 118 have the sections 116e extending along the base end face 118. This configuration can suppress a decrease in strength compared with a configuration in which the ends of the fiber-containing layers 116d are disposed at the base end face 118. However, it is also possible not to provide the sections 116e, as in the modification.

The invention claimed is:

1. A joint structure comprising:
   a first member comprising a projection having a distal end and a base end, the distal end being thicker than the base end; and
   a second member made of a material different from a material of the first member and having a fitting groove into which the projection is to be inserted, wherein the projection includes, on a surface thereof, an inclined surface extending from the distal end to the base end and inclined with respect to a facing direction in which the first member and the second member face each other, wherein the projection includes at least a plurality of fiber-containing layers that each have a section in which a fiber extends along the inclined surface, wherein the projection further includes a second inclined surface extending from the distal end to the base end and is inclined in an opposite direction than the inclined surface with respect to a facing direction, and wherein the plurality of fiber-containing layers includes a layer that extends along the inclined surface and the second inclined surface, the layer having a section that connects a distal end of the layer extending along; the inclined surface to a distal end of the layer extending along the second inclined surface.

2. The joint structure according to claim 1, wherein
the distal end of the projection comprises an end face extending perpendicular to the facing direction, and
the fiber-containing layers constituting the projection comprise a section extending along the end face.

3. The joint structure according to claim 2, wherein, in the fiber-containing layers constituting the projection, a section extending along the inclined surface and the section extending along the end face are continuous.

4. The joint structure according to claim 3, wherein
the base end is positioned at a base end face of the first member,
the base end face is formed of the plurality of fiber-containing layers, and
the plurality of fiber-containing layers constituting the base end face comprise a section extending along the base end face.

5. The joint structure according to claim 4, wherein the first member includes a fiber reinforced plastic.

6. The joint structure according to claim 3, wherein the first member includes a fiber reinforced plastic.

7. The joint structure according to claim 2, wherein
the base end is positioned at a base end face of the first member,
the base end face is formed of the plurality of fiber-containing layers, and
the plurality of fiber-containing layers constituting the base end face comprise a section extending along the base end face.

8. The joint structure according to claim 7, wherein the first member includes a fiber reinforced plastic.

9. The joint structure according to claim 2, wherein the first member includes a fiber reinforced plastic.

10. The joint structure according to claim 1, wherein, in the fiber-containing layers constituting the projection, a section extending along the inclined surface and a section extending along the end face are continuous.

11. The joint structure according to claim 10, wherein
the base end is positioned at a base end face of the first member,
the base end face is formed of the plurality of fiber-containing layers, and
the plurality of fiber-containing layers constituting the base end face comprise a section extending along the base end face.

12. The joint structure according to claim 11, wherein the first member includes a fiber reinforced plastic.

13. The joint structure according to claim 10, wherein the first member includes a fiber reinforced plastic.

14. The joint structure according to claim 1, wherein
the base end is positioned at a base end face of the first member,
the base end face is formed of the plurality of fiber-containing layers, and
the plurality of fiber-containing layers constituting the base end face comprise a section extending along the base end face.

15. The joint structure according to claim 14, wherein the first member includes a fiber reinforced plastic.

16. The joint structure according to claim 1, wherein the first member includes a fiber reinforced plastic.

17. The joint structure according to claim 1, wherein the fitting groove includes a bottom surface disposed at an opposite end of a side of the fitting groove that receives the projection, and
wherein at least one of the plurality of fibers includes a section in which a fiber extends parallel to the bottom surface.

18. The joint structure according to claim 1, wherein at least one of the plurality of fibers includes a section in which a fiber extends perpendicular to the facing direction.

19. A joint structure comprising:
a first member comprising a projection having a distal end and a base end, the distal end being thicker than the base end; and
a second member made of a material different from a material of the first member and having a fitting groove into which the projection is to be inserted,
wherein the projection includes, on a surface thereof, an inclined surface extending from the distal end to the base end and inclined with respect to a facing direction in which the first member and the second member face each other, and
wherein the projection includes a fiber-containing layer that has a section in which a fiber extends perpendicular to the facing direction.

20. A joint structure comprising:
a first member comprising a projection having a distal end and a base end, the distal end being thicker than the base end; and
a second member made of a material different from a material of the first member and having a fitting groove into which the projection is to be inserted,
wherein the projection includes a fiber-containing layer that has a section in which a fiber extends in a direction parallel to a thickness direction of the distal end of the projection.

* * * * *